United States Patent [19]

Namba

[11] Patent Number: 5,721,899
[45] Date of Patent: Feb. 24, 1998

[54] RETRIEVAL APPARATUS USING COMPRESSED TRIE NODE AND RETRIEVAL METHOD THEREOF

[75] Inventor: Isao Namba, Kanagawa, Japan

[73] Assignee: Fujitsu Limited, Kawasaki, Japan

[21] Appl. No.: 557,430

[22] Filed: Nov. 14, 1995

[30] Foreign Application Priority Data

Nov. 16, 1994 [JP] Japan ................................ 6-281054
Sep. 8, 1995 [JP] Japan ................................ 7-230843

[51] Int. Cl.⁶ .................................................... G06F 17/30
[52] U.S. Cl. ........................ 395/603; 395/601; 395/605; 395/606; 395/607
[58] Field of Search ................................ 395/603, 612, 395/613, 601, 605, 606, 607

[56] References Cited

U.S. PATENT DOCUMENTS 5,640,551  6/1997  Chu et al. .............................. 395/605

*Primary Examiner*—Wayne Amsbury
*Attorney, Agent, or Firm*—Armstrong, Westerman, Hattori, McLeland, & Naughton

[57] ABSTRACT

A retrieval apparatus compresses TRIE nodes, adds code ID labels as identifying codes thereto, and retrieves an input key corresponding to the compressed TRIE nodes. The input code is converted into an inner code for each unit code. Each unit code is collated with the label of each TRIE node. When they match, the position of the next TRIE node is determined corresponding to the pointer information stored in the corresponding position and the inner code of the next unit code.

14 Claims, 21 Drawing Sheets

| 14 | | | | | | | | | |
|---|---|---|---|---|---|---|---|---|---|
| CHARACTER CODE | # | a | b | c | d | e | f | g | ... | z |
| TRIE INNER CODE | 1 | 2 | 3 | 4 | 5 | 6 | 7 | 8 | ... | 27 |

F I G. 3 A

| index | 1 | 2 | 3 | 4 | 5 | 6 | 7 | 8 | 9 | 10 | 11 | 12 |
|---|---|---|---|---|---|---|---|---|---|---|---|---|
| 21 TRIE | 1 | 0 | 4 | 6 | K1 | 0 | K2 | K4 | 0 | K5 | 0 | K3 |
| 22 CHECK | 0 | 0 | a | b | # | 0 | b | a | 0 | c | 0 | g |

F I G. 3 B

| 23 | K1 | K2 | K3 | K4 | K5 |
|---|---|---|---|---|---|
| INTRINSIC CODE SEQUENCE | φ | normal# | ree # | chelor# | s # |

F I G. 3 C

KEYS: a#, abnormal#, agree#, bachelor#, bcs#
FIG. 4A
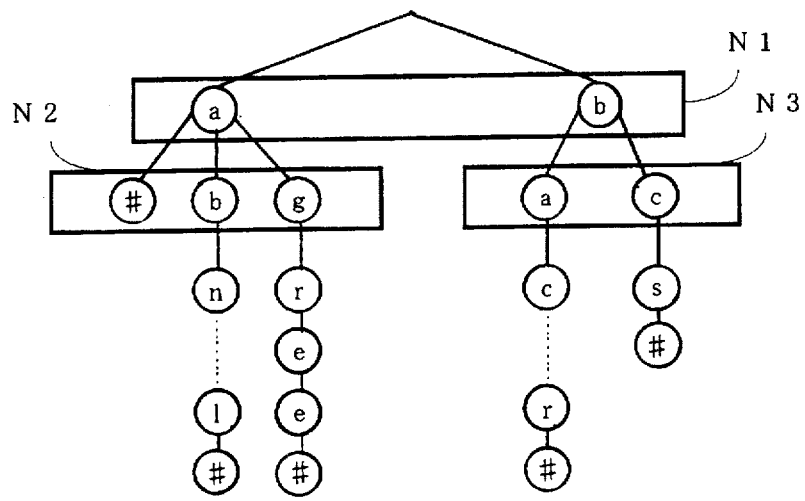
FIG. 4B
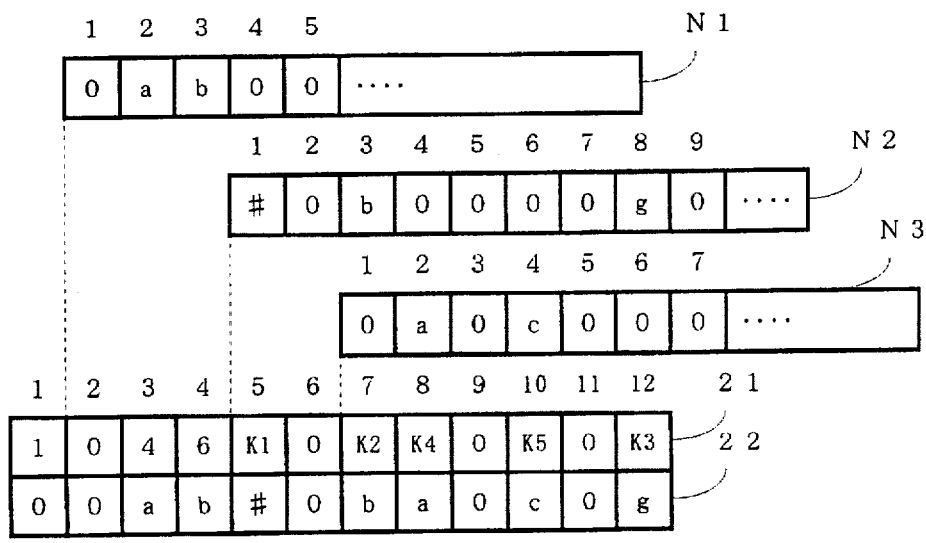
FIG. 4C
FIG. 4D

| CHARACTER CODE | # | あ | い | さ | る | つ | 住 | 居 | 嘘 | ... |
|---|---|---|---|---|---|---|---|---|---|---|
| TRIE INNER CODE | 1 | 2 | 3 | 4 | 5 | 6 | 7 | 8 | 9 | ... |

14

F I G. 6 A

| index | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| TRIE | 1 | 0 | 4 | K1 | K2 | K6 | 0 | K3 | 8 | 5 | K7 | 0 | K4 | 0 | K5 |
| CHECK | 0 | 0 | あ | い | # | # | 0 | さ | 居 | 嘘 | つ | 0 | る | 0 | 住 |

21 / 22

F I G. 6 B

| | K1 | K2 | K3 | K4 | K5 | K6 | K7 |
|---|---|---|---|---|---|---|---|
| INTRINSIC CODE SEQUENCE | ろ# | φ | がお# | # | # | φ | き# |

23

F I G. 6 C

KEYS: あ#, あさがお#, いろ#, 居る#, 居住#, 嘘#, 嘘つき#

| 23 | K1 | K2 | K3 | K4 | K5 | K6 | K7 |
|---|---|---|---|---|---|---|---|
| INTRINSIC CODE SEQUENCE | 3# | φ | がお# | # | # | φ | き# |

| INDEX | 1 | 2 | 3 | 4 | 5 | 6 | 7 | 8 |
|---|---|---|---|---|---|---|---|---|
| TRIE | 1 | 0 | 0 | 0 | 0 | 0 | 0 | 0 |
| CHECK | 0 | 0 | 0 | 0 | 0 | 0 | 0 | 0 |

FIG. 10

| INDEX | 1 | 2 | 3 | 4 | 5 | 6 | 7 | 8 |
|---|---|---|---|---|---|---|---|---|
| TRIE | 1 | 0 | 0 | 0 | 0 | 0 | 0 | 0 |
| CHECK | 0 | 0 | a | b | 0 | 0 | 0 | 0 |

FIG. 11

| INDEX | 1 | 2 | 3 | 4 | 5 | 6 | 7 | 8 |
|-------|---|---|---|---|---|---|---|---|
| TRIE | 1 | 0 | @1a | @1b | 0 | 0 | 0 | 0 |
| CHECK | 0 | 0 | a | b | 0 | 0 | 0 | 0 |

| INDEX | 1 | 2 | 3 | 4 | 5 | 6 | 7 | 8 | 9 | 10 | 11 | 12 |
|---|---|---|---|---|---|---|---|---|---|---|---|---|
| TRIE | 1 | 0 | @1a | @1b | 0 | 0 | 0 | 0 | 0 | 0 | 0 | 0 |
| CHECK | 0 | 0 | a | b | 0 | 0 | 0 | 0 | 0 | 0 | 0 | 0 |
|  |  |  |  | # | 0 | b | 0 | 0 | 0 | 0 | g |  |

FIG. 14

| INDEX | 1 | 2 | 3 | 4 | 5 | 6 | 7 | 8 | 9 | 10 | 11 | 12 |
|---|---|---|---|---|---|---|---|---|---|---|---|---|
| TRIE | 1 | 0 | 4 | @1b | 0 | 0 | 0 | 0 | 0 | 0 | 0 | 0 |
| CHECK | 0 | 0 | a | b | 0 | 0 | 0 | 0 | 0 | 0 | 0 | 0 |

FIG. 15

| INDEX | 1 | 2 | 3 | 4 | 5 | 6 | 7 | 8 | 9 | 10 | 11 | 12 |
|-------|---|---|---|---|---|---|---|---|---|----|----|----|
| TRIE  | 1 | 0 | 4 | @1b | 0 | 0 | 0 | 0 | 0 | 0 | 0 | 0 |
| CHECK | 0 | 0 | a | b | # | 0 | b | 0 | 0 | 0 | 0 | g |

FIG. 16

| INDEX | 1 | 2 | 3 | 4 | 5 | 6 | 7 | 8 | 9 | 10 | 11 | 12 |
|-------|---|---|---|---|---|---|---|---|---|----|----|----|
| TRIE  | 1 | 0 | 4 | @1b | @2# | 0 | @2b | 0 | 0 | 0 | 0 | @2g |
| CHECK | 0 | 0 | a | b | # | 0 | b | 0 | 0 | 0 | 0 | g |

FIG. 17

| INDEX | 1 | 2 | 3 | 4 | 5 | 6 | 7 | 8 | 9 | 10 | 11 | 12 |
|---|---|---|---|---|---|---|---|---|---|---|---|---|
| TRIE | 1 | 0 | 4 | @1b | K1 | 0 | @2b | 0 | 0 | 0 | 0 | @2g |
| CHECK | 0 | 0 | a | b | # | 0 | b | 0 | 0 | 0 | 0 | g |

FIG. 18

| INDEX | 1 | 2 | 3 | 4 | 5 | 6 | 7 | 8 | 9 | 10 | 11 | 12 |
|-------|---|---|---|---|---|---|---|---|---|----|----|----|
| TRIE  | 1 | 0 | 4 | @1b | K1 | 0 | K2 | 0 | 0 | 0 | 0 | K3 |
| CHECK | 0 | 0 | a | b | ♯ | 0 | b | 0 | 0 | 0 | 0 | g |

FIG. 19

| INDEX | 1 | 2 | 3 | 4 | 5 | 6 | 7 | 8 | 9 | 10 | 11 | 12 |
|---|---|---|---|---|---|---|---|---|---|---|---|---|
| TRIE | 1 | 0 | 4 | 6 | K1 | 0 | K2 | K4 | 0 | K5 | 0 | K3 |
| CHECK | 0 | 0 | a | b | # | 0 | b | a | 0 | c | 0 | g |

FIG. 20

RETRIEVAL APPARATUS USING COMPRESSED TRIE NODE AND RETRIEVAL METHOD THEREOF

BACKGROUND OF THE INVENTION

1. Field of the Invention

The present invention relates to a retrieval apparatus and a dictionary/text retrieval method. In particular, the present invention relates to a high speed and small capacity retrieval method, a dictionary retrieval method, and a text retrieval method thereof.

In an apparatus that retrieves various dictionaries and databases with text keywords for use with a machine translation, a natural-spoken language analysis, or a voice recognition system, the retrieval speed should be fast and the index size should be small.

2. Description of the Related Art

As conventional retrieval apparatuses, hash method, B-tree method, TRIE (tree retrieval) method, and so forth have been proposed and used.

The basic conception of a retrieval apparatus using a conventional TRIE method will now be described.

FIG. 1 is a schematic diagram showing an example of a conventional TRIE dictionary retrieval apparatus. The TRIE dictionary retrieval apparatus shown in FIG. 1 has a TRIE node selection system 1 and a TRIE node storage unit 2.

In a dictionary retrieval apparatus having English text entries, one TRIE node is composed of (26+1) TRIE node elements including an end symbol (for example, #).

FIG. 1 shows an example of the construction of TRIE nodes with keys of a#, able#, and agree# (where # is an end symbol of a key) of the TRIE node storage unit 2. A first TRIE node storage unit N1 represents key information of the first character. At the first TRIE node N1, a character "a" is valid. At the character "a", a pointer to the next TRIE node N2 is stored. At a second TRIE node N2, the second characters "#", "b", and "g" are valid. At the second TRIE node N2, from the position of "#", data to be retrieved or access information to the data is pointed. From the position of "b" at the TRIE node N2, the next TRIE node N3 is pointed. From the position of "g" at the TRIE node N2, a TRIE node N6 is pointed. Likewise, TRIE nodes of valid characters are chained.

The TRIE node selection system 1 obtains one character from an input key at a time and determines whether character positions of the TRIE node storage unit 2 have valid pointer information from the first TRIE node storage unit N1, so as to obtain access information of desired data corresponding to the TRIE node chain.

In the TRIE method, a key retrieval is performed by comparing each element of the key with each TRIE node. Since TRIE node elements and characters are compared corresponding to character positions of TRIE nodes, the retrieval operation can be performed at high speed.

In the hash method for use with a conventional retrieval apparatus, if keys frequently hit, a complicated control is required. Thus, due to such a time demand, the retrieval operation becomes slow. To prevent keys from hitting, a large storage area should be prepared.

In the B-Tree method, although a large storage area is not required, the retrieval operation cannot be performed at high speed.

On the other hand, in the conventional TRIE method, although the retrieval speed is high, since a large number of TRIE nodes are required and there are wasteful areas in the TRIE nodes, a large storage capacity is required. Thus, when there are a large number of keys, it is very difficult to construct a dictionary for all keys.

SUMMARY OF THE INVENTION

An object of the present invention is to solve the above-described problems and to reduce the storage capacity of a retrieval apparatus using the TRIE method without trading off high speed.

The retrieval apparatus according to the present invention comprises a code conversion processing portion, a node selection processing portion, a node storage portion, an identification label storage portion, and an intrinsic code sequence storage portion. The retrieval apparatus retrieves data with an input key corresponding to the TRIE method.

The node storage portion stores compressed TRIE nodes for retrieving a plurality of input keys. The identification label storage portion stores labels for checking whether unit codes to be retrieved are included in TRIE nodes or not. The intrinsic code sequence storage portion stores a code sequence intrinsic to a specific input key.

The code conversion processing portion obtains one unit code from the input key at a time and converts it into a TRIE inner code. The node selection processing portion determines whether or not the obtained unit code is included in a node corresponding to a label stored in the label storage portion. When the unit code is included in a node, the node selection processing portion obtains pointer information stored at the position corresponding to the unit code in the node storage portion. Corresponding to the pointer information, the collating process is performed for the next unit code.

When the obtained pointer information is pointer information of the next TRIE node, the position of the next TRIE node to be collated is obtained using the pointer information and the inner code of the next unit code. Thereafter, a jump to the node is performed. The next unit code and the label of the TRIE node are compared. When the next unit code matches the label, pointer information stored at the position corresponding to the label is obtained and a similar process is repeated.

When the obtained pointer information is pointer information to an intrinsic code sequence, the intrinsic code sequence corresponding to the information is obtained from the intrinsic code sequence storage portion. The obtained intrinsic code sequence is compared with the rest of the code sequence of the input key. When they match, the retrieval path to the intrinsic code sequence is the retrieval result of the input key.

According to the retrieval method of the present invention, since TRIE nodes are compressed and stored, the memory area required for storing them can be reduced. In addition, the position of the next TRIE node to be collated can be quickly obtained from the compressed TRIE nodes. Thus, the high speed retrieval process is not deteriorated. The present invention can be applied for retrieving data from a Kana-Kanji conversion dictionary, a morpheme analysis, a syntax analysis dictionary, and a voice recognition dictionary. In addition, the present invention can be applied for retrieving data from a text database with an input key of text data.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 3A is a table showing an example of an English code conversion table;

FIG. 3B is a table showing examples of an English node storage portion and an identification label storage portion;

FIG. 3C is a table showing an example of an English intrinsic code sequence storage portion;

FIG. 4A is a table showing an example of an English retrieval key;

FIG. 4B is a schematic diagram showing a tree structure of English retrieval keys;

FIG. 4C is a table showing an example of an English intrinsic code sequence storage portion;

FIG. 4D is a table showing a generating method of an English node storage portion and an identification label storage portion;

FIG. 6A is a table showing an example of a Japanese code conversion table;

FIG. 6B is a table showing examples of a Japanese node storage portion and an identification label storage portion;

FIG. 6C is a table showing an example of a Japanese intrinsic code storage portion;

FIGS. 10, 11, 12, 14, 15, 16, 17, 18, 19, and 20 are tables showing examples of array data in the case that TRIE nodes are compressed;

FIG. 13 is a table showing an example of a conversion from labels to inner codes;

DESCRIPTION OF PREFERRED EMBODIMENTS

Next, with reference to the accompanying drawings, preferred embodiments of the present invention will be described.

Figure 1:
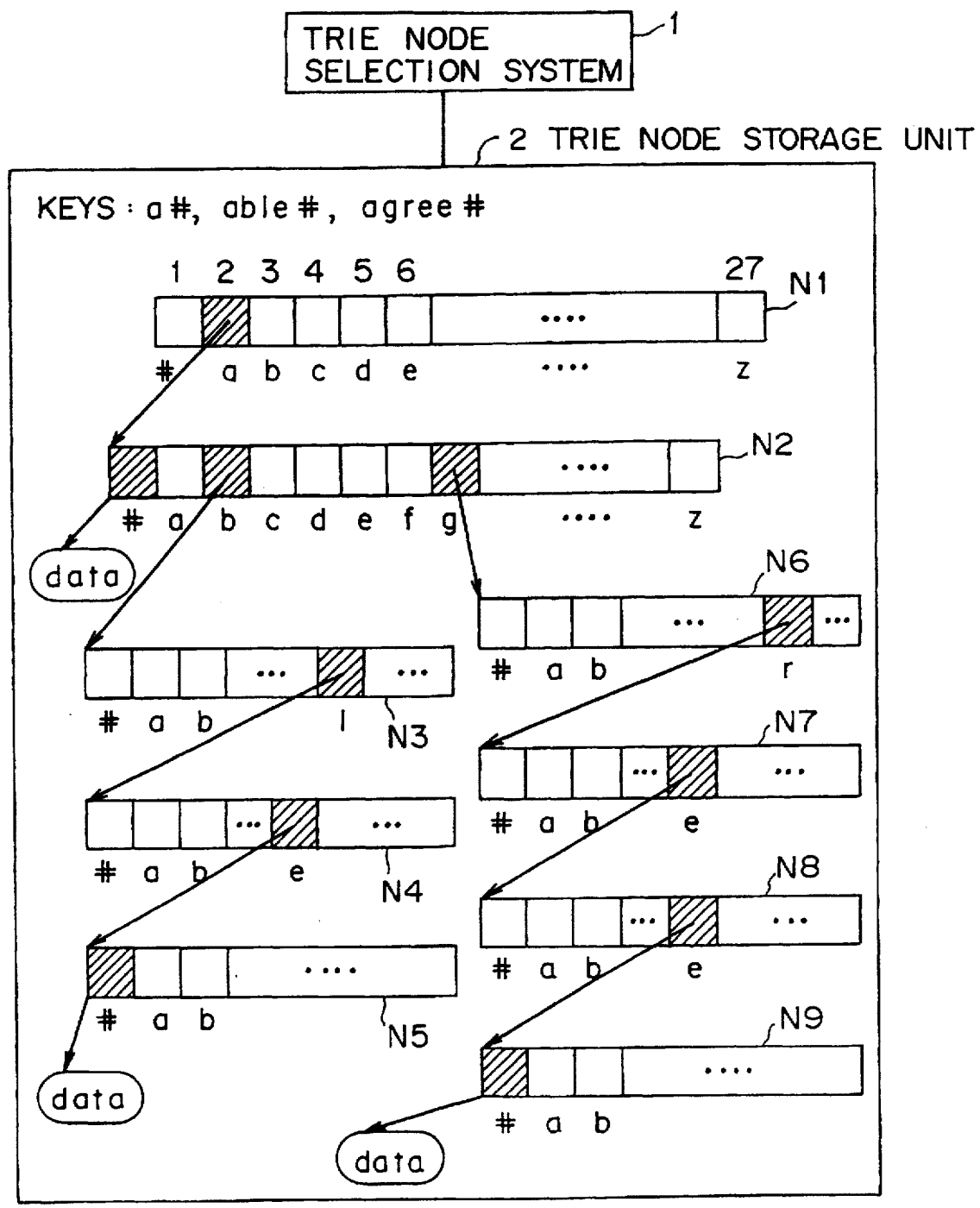
FIG. 1 is a schematic diagram showing a conventional TRIE dictionary retrieval apparatus.
Figure 2:
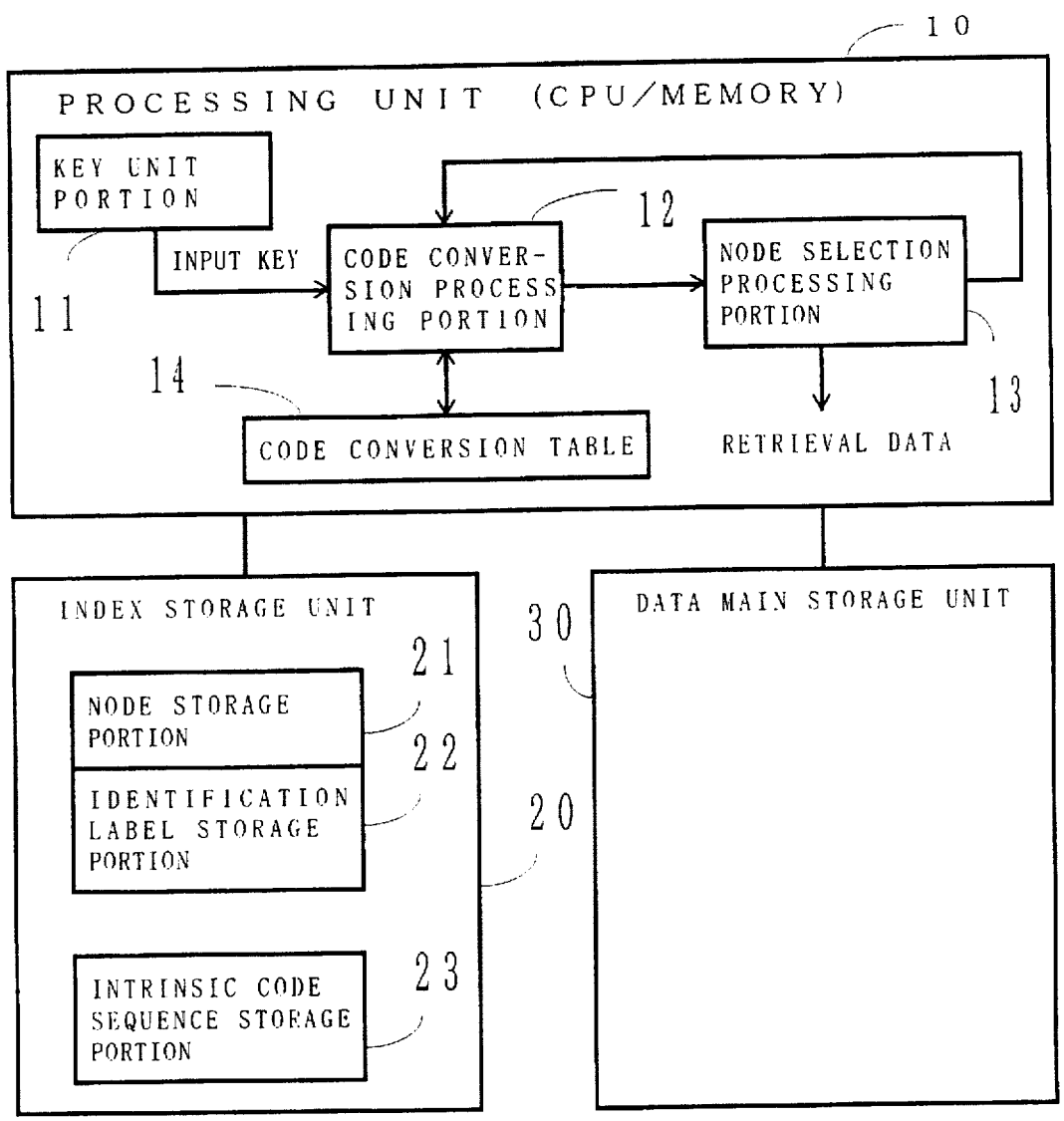
FIG. 2 is a block diagram showing the construction of a retrieval apparatus according to an embodiment of the present invention.

FIG. 2 is a block diagram showing a retrieval apparatus according to the present invention.

In FIG. 2, a processing unit 10 is constructed of a CPU that executes a retrieval process and a memory. The processing unit 10 comprises a key input portion 11 that inputs a retrieval key, a code conversion processing portion 12 that converts each unit code of the input key into a TRIE inner code, a node selection processing portion 13 that selects TRIE nodes and performs the retrieval process, and a code conversion table 14 that stores conversion information of unit codes of input key and TRIE inner codes. An index storage unit 20 manages the relation of retrieval keys and data. The index storage unit 20 comprises a node storage portion 21 that stores a compressed TRIE node, an identification label storage portion 22 that stores labels corresponding to TRIE nodes, and an intrinsic code sequence storage portion 23 that stores a code sequence intrinsic to keys of TRIE nodes. The labels are used to determine whether a unit code to be retrieved is included in a node so as to collate a compressed TRIE node. In addition, the retrieval apparatus also comprises a data main storage unit 30 that stores data.

The key input portion 11 receives a key to be retrieved and sends the key to the code conversion processing portion 12. The code conversion processing portion 12 obtains one unit code from the input key at a time, converts each unit code into a TRIE inner code by a predetermined calculation or corresponding to the code conversion table 14, and sends the converted result to the node selection processing portion 13.

The node storage portion 21 stores compressed TRIE nodes so that conventional TRIE nodes are arrayed. The identification label storage portion 22 stores a label for determining whether or not a unit code that is being retrieved is present at a node of the node storage portion 21. The intrinsic code sequence storage portion 23 stores a code sequence intrinsic to the key of the TRIE node.

The node selection processing portion references the node storage portion 21 and the identification label storage portion 22 and determines whether the unit code that is being input is present in a TRIE node. When the unit code is present, the node selection processing portion 13 processes the next TRIE node and receives the next unit code from the code conversion processing portion 12. When the unit code is absent in a TRIE node, the node selection processing portion 13 determines that the input key is not present in the data. When a pointer to the code sequence intrinsic to the key of the intrinsic code sequence storage portion 23 is stored in the current TRIE node, the rest of the code sequence of the key or the inner code sequence thereof is collated with the code sequence intrinsic to the key of the intrinsic code sequence storage portion 23. When they match and the key can be collated, access information to data corresponding to the input key in the data storage unit 30 is obtained. Otherwise, the node selection processing portion 13 determines that the data corresponding to the input key is not stored in the data main storage unit 30.

According to the present invention, the conventional individual TRIE nodes are arrayed so that valid elements are not redundant. Thus, compressed TRIE nodes are formed. To determine whether or not a unit code that is being retrieved is present in a current TRIE node, an identification label is stored corresponding to each node element. A portion intrinsic to an input key is obtained and stored in the intrinsic code storage portion 23 instead of the node storage portion 21.

Thus, at the conventional retrieval speed, the storage capacity can be reduced.

By a combination of the retrieval apparatus shown in FIG. 2 and words of a natural language, compressed TRIE nodes are formed. By managing entries of the dictionary in such a manner, a Kana-Kanji conversion dictionary, a morpheme analysis apparatus, and a syntax analysis apparatus with a high retrieval speed and a small index size can be accomplished.

By a combination of the retrieval apparatus shown in FIG. 2 and voice data of a natural-spoken language, compressed TRIE nodes are formed. By managing a recognition category corresponding to the voice data in such a manner, a voice recognition dictionary with a high retrieval speed and a small index size can be accomplished.

In addition, by a combination of the retrieval apparatus shown in FIG. 2 and text data, compressed TRIE nodes are formed. By using the compressed TRIE nodes as indexes of a database in such a manner, a data base text retrieval apparatus with a high retrieval speed and a small index size can be accomplished.

FIG. 3A is a table showing an example of the construction of a code conversion table according to an embodiment of the present invention. FIGS. 3B and 3C are tables showing the construction of an index storage unit.

In the case of a dictionary retrieval apparatus with English text entries, as shown in FIG. 3A, a code conversion table 14 that has information for converting a symbol "#" (that represents the end of a key) and alphabet characters "a" to "z" into TRIE inner codes 1 to 27 is prepared. It should be noted that the code conversion processing portion 12 can convert unit codes of the input key into TRIE inner codes by arithmetic operations, considering character codes as binary values.

FIG. 3B is a table showing storage states of the node storage portion 21 (hereinafter referred to as the TRIE) and the identification label storage portion 22 (hereinafter referred to as the CHECK) in the case that there are five keys "a#", "abnormal#", "agree#", "bachelor#", and "bcs#".

In "a#", "abnormal#", "agree#", "bachelor#", and "bcs#" keys, portions that do not affect other keys are obtained as code sequences intrinsic to the keys and stored in the intrinsic code sequence storage portion 23 as shown in FIG. 3C.

Next, with reference to FIGS. 4A, 4B, 4C, and 4D, the method for generating the dictionary shown FIGS. 3A, 3B, and 3C will be described.

In this case, it is assumed that there are five keys as shown in FIG. 4A. To simplify the description, each character of the keys is developed into a tree structure as shown in FIG. 4B. When character string portions that do not branch are obtained from the keys, code sequences intrinsic to the keys to be stored in the intrinsic code sequence storage portion 23 are obtained as shown in FIG. 4C. As the code sequences stored in the intrinsic code storage portion 23, original code sequences of the input keys or inner code sequences of which the original code sequences have been converted into TRIE inner codes can be used.

The node storage portion 21 and the identification label storage portion 22 are generated in the following manner. Firstly, considering TRIE nodes N1, N2, and N3 equivalent to conventional TRIE nodes in the tree structure shown in FIG. 4B, an invalid portion of each node element is denoted by "0" and a valid portion thereof is denoted by "1". Thus, TRIE nodes N1 to N3 as shown in FIG. 4D are obtained. The TRIE nodes N1 to N3 are arrayed to one TRIE node so that valid portions are not redundant. Thus, the node storage portion 21 shown in FIG. 4D is generated. At the beginning of the TRIE node of the node storage portion 21, a node element with an index value of "1" is placed for convenience.

At the third entry (the position of the first "a") of the node storage portion 21, since the node sequence equivalent to the next TRIE node N2 starts from the fourth entry of the TRIE node N1 (the fifth entry of the node storage portion 21), "4" is stored as an index value. At the fourth entry (the position of "b") of the node storage portion 21, since the node sequence equivalent to the next TRIE node N3 starts from the sixth entry of the TRIE node N1 (the seventh entry of the node storage portion 21), "6" is stored as an index value.

When a code that follows a unit code corresponding to each node element of the node storage portion 21 is composed of only an intrinsic code sequence, one of pointers K1 to K5 to the intrinsic code sequences in the intrinsic code sequence portions 23 is stored in the node element. It is determined whether or not a node element is a pointer to a TRIE node or an intrinsic code sequence corresponding to the value of the first bit as a flag. More specifically, a positive value is used as a pointer to a TRIE node and a negative value as a pointer to an intrinsic code sequence.

At each entry of the identification label storage portion 22, a character code or an inner code corresponding to each node element of the node storage portion 21 is stored as an identification label. For an invalid entry of the node storage portion 21 and the identification label storage portion 22, a null code ("0") or the like is designated.

Thus, the index storage unit 20 that has TRIE, CHECK, and intrinsic code sequences, can be generated. In this case, TRIE is an integer array that stores compressed TRIE nodes. CHECK is a character array that stores character labels for determining whether or not characters are included in TRIE nodes. Each element of CHECK is composed of one byte.

In the conventional TRIE structure, an area of 128×22 elements is required as a TRIE node area. However, according to this embodiment, as will be clear from FIGS. 3B and 3C, an area of only 12 elements+12 characters+22 characters is required.

Figure 5:
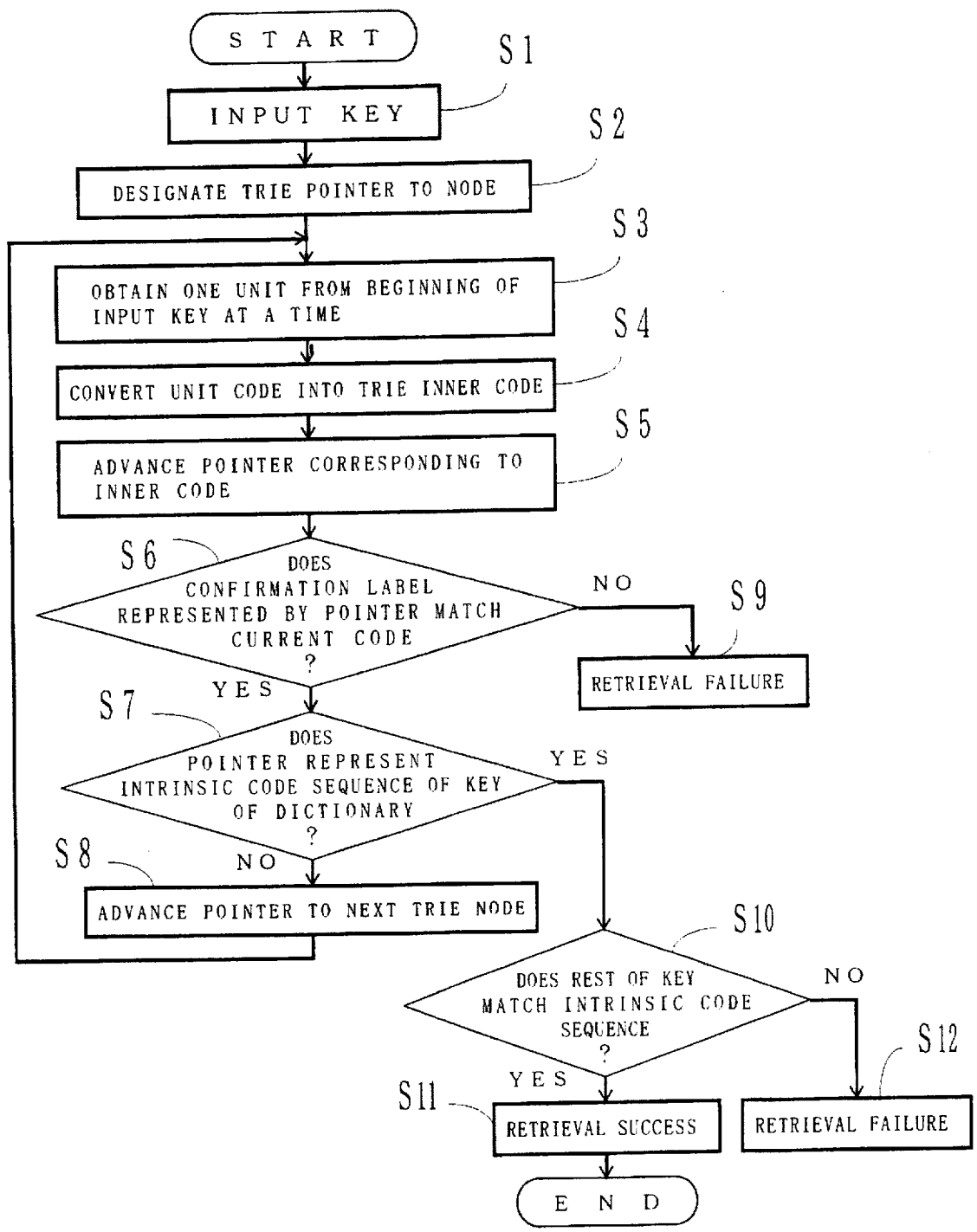
FIG. 5 is a flow chart showing a retrieval process.

FIG. 5 is a flow chart showing a retrieval process according to the embodiment of the present invention.

At step S1, a retrieval key is input from an input unit, a retrieval request program, or the like.

At step S2, the process unit 10 designates TRIE retrieval pointers to the first nodes of the node storage portion 21 and the identification label storage portion 22. Thereafter, the flow advances to step S3.

At step S3, elements are obtained from the beginning of the input key so as to compare the input key. When the input key is composed of a character string, one character code is obtained at a time. At step S4, the obtained unit code is converted into a TRIE inner code corresponding to the code conversion table 14, or by arithmetic operations or bit operations.

Thereafter, at step S5, the TRIE retrieval pointer is advanced corresponding to the inner code. At step S6, the identification label storage portion 22 is referenced so as to determine whether or not the identification label represented by the pointer matches the current code. When they do not match, the flow advances to step S9. At step S9, a retrieval failure notification is sent to a retrieval request source.

When the identification label matches the current code, the flow advances to step S7. At step S7, it is determined whether or not the element represented by the pointer of the node storage portion 21 represents the intrinsic code sequence storage portion 23 of the key of the dictionary. When the element does not represent the intrinsic code sequence storage portion 23, the flow advances to step S8. At step S8, the pointer is advanced to the next TRIE node corresponding to the value of the node element of the node storage portion 21. Thereafter, the flow returns to step S3. At step S3, the same process is repeated for the next unit code.

When the determined result at step S7 is YES (namely, the pointer represents the intrinsic code sequence storage portion 23 of the dictionary), the flow advances to step S10. At step S10, it is determined whether or not the rest of the key matches the intrinsic code sequence represented by the pointer. When the determined result is YES (namely, they match), the flow advances to step S11. At step S11, as a retrieval success, the access information to the data corresponding to the input key is obtained and sent to the retrieval request source. When the determined result at step S10 is NO (namely, the rest of the key does not match the intrinsic code sequence), the flow advances to step S12. At step S12, a retrieval failure notification is sent to the retrieval request source.

Next, with reference to the process flow shown in FIG. 5, an example of a real retrieval process using the index storage unit shown in FIGS. 3B and 3C will be described.

[In the case that a retrieval request for a key "a#" is issued (the retrieval result is successful)]

(1) A key "a#" is input (at step S1 of FIG. 5).

(2) "1" is designated to the pointer value so that the pointer represents the first node (at step S2).

(3) A character code "a" is obtained from the input key "a#" (at step S3).

(4) The character code "a" is converted into a TRIE inner code "2" (at step S4).

(5) The inner code "2" is added to the pointer "1" so as to advance the pointer value to "3" (at step S5).

(6) Since the pointer value is "3", it is determined whether or not the identification label "a" stored at the third element of CHECK matches the current code "a" (at step S6).

(7) Since the determined result is YES (namely, they match), it is determined whether or not the third element of TRIE represents an intrinsic code sequence (at step S7).

(8) Since the third element of TRIE is "4", the determined result is NO (namely, the third element of TRIE does not represent an intrinsic code sequence). Thereafter, the pointer value is advanced to "4" (at step S8).

(9) The next character code "#" is obtained from the input key "a#" (at step S3).

(10) The character code "#" is converted into the trie inner code "1" (at step S4).

(11) The inner code "1" is added to the pointer "4" so as to advance the pointer value to "5" (at step S5).

(12) It is determined whether or not the identification label "#" stored at the fifth element of CHECK matches the current code "#" (at step S6).

(13) Thereafter, it is determined whether or not the fifth element of TRIE represents an intrinsic code sequence (at step S7).

(14) Since the fifth element of TRIE represents "K1" of the intrinsic code sequence storage portion 23, it is determined whether or not the rest of the key matches the content of the intrinsic code sequence of "K1" (at step S10).

(15) Since there is no key to be retrieved and the content of the intrinsic code sequence of "K1" is empty (φ), the determined result is YES and thereby the retrieval result is successful (at step S11).

[In the case that a retrieval request of a key "ac#" is issued (the retrieval result is unsuccessful)]

(1) A key "ac#" is input (at step S1 of FIG. 5).

(2) "1" is designated to the pointer value so as to represent the first node (at step S2).

Thereafter, steps (3) to (8) that are the same as those of the retrieval of the key "a#" are performed.

(9) The next character code "c" is obtained from the input key "ac#" (at step S3).

(10) The character code "c" is converted into the trie inner code "4" (at step S4).

(11) The inner code "4" is added to the pointer "4" so as to advance the pointer value to "8" (at step S5).

(12) Since the pointer value is "8", it is determined whether or not the identification label "a" stored at the eighth element of CHECK matches the current code "c" (at step S6).

(13) Since the identification label "a" does not match the current code "c", there is no key "ac#" and thereby the retrieval is unsuccessful (at step S9).

FIG. 6A is a table showing a code conversion table of a dictionary retrieval apparatus with Japanese keys according to an embodiment of the present invention. FIGS. 6B and 6C are tables showing examples of constructions of the index storage units corresponding to the code conversion table. In the examples shown in FIGS. 6A, 6B, and 6C, a dictionary with keys of Japanese character strings "あ#", "あさがお#", "お#", "いろ#", "居る#", "居住#", "壷#", and "壷つき#".

A code conversion table 14 is composed as shown in FIG. 6A. A node storage portion 21 and an identification label storage portion 22 are composed as shown in FIG. 6B. An intrinsic code sequence storage portion 23 is composed as shown in FIG. 6C. In the conventional TRIE structure, an area of around 6000×13 elements is required. On the other hand, according to this embodiment, an area of only 15 elements+15 characters+11 characters is required.

Figures 7A, 7B, 7C:
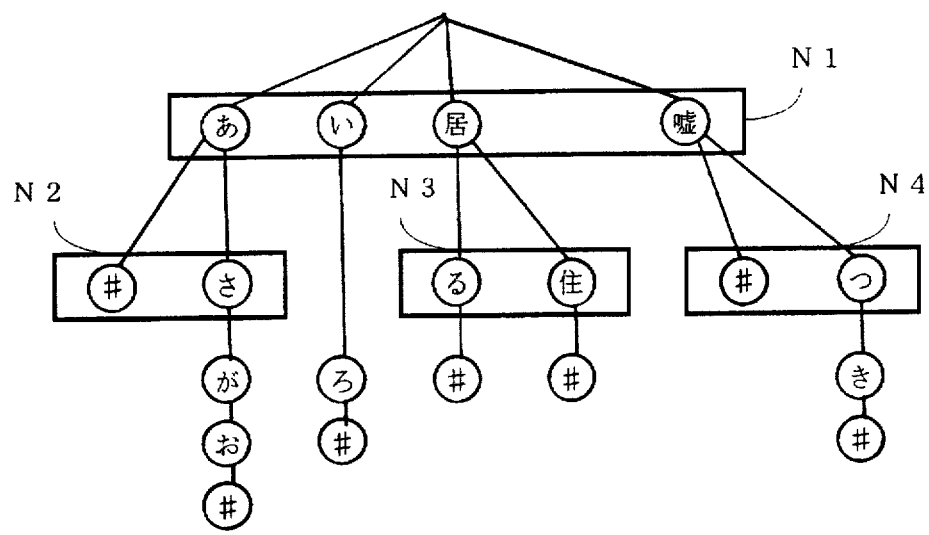
FIG. 7A is a table showing examples of Japanese retrieval keys.
FIG. 7B is a schematic diagram showing a tree structure of Japanese retrieval keys.
FIG. 7C is a table showing a Japanese intrinsic code sequence storage portion.

FIG. 7A is a schematic diagram showing seven Japanese keys. These keys are developed into a tree structure shown in FIG. 7B. In the tree structure of FIG. 7B, by obtaining character sequence portions that are not obtained in the TRIE nodes N1, N2, N3, and N4, intrinsic code sequences as shown in FIG. 7C are obtained.

Next, retrieval examples of this dictionary will be described.

[In the case that a retrieval request of a key "あさがお#" is issued (the retrieval result is successful)]

(1) A key "あさがお#" is input (at step S1 of FIG. 5).

(2) "1"is designated to the pointer value so as to represent the first node (at step S2).

(3) A character code "あ" is obtained from the input key "あさが, お#" at step S3).

(4) The character code "あ" is converted into the TRIE inner code "2" (at step S4).

(5) The inner code "2" is added to the pointer "1" so as to advance the pointer value to "3" (at step S5).

(6) Since the pointer value is "3", it is determined whether or not the identification label "あ" stored at the third element of CHECK matches the current code "あ" (at step S6).

(7) Since they match, it is determined whether the third element of TRIE represents an intrinsic code sequence (at step S7).

(8) Since the third element of TRIE is "4" and thereby it does not represent an intrinsic code sequence, the pointer value is advanced to "4" (at step S8).

(9) The next character code "さ" is obtained from the input key "あさがお#" (at step S3).

(10) The character code "さ" is converted into the TRIE inner code "4" (at step S4).

(11) The inner code "4" is added to the pointer value "4" so as to advance the pointer value to "8" (at step S5).

(12) Since the pointer value is "8", it is determined whether or not the identification label "さ" stored at the eighth element of CHECK matches the current code "さ" (at step S6).

(13) Since they match, it is then determined whether or not the eighth element of TRIE represents an intrinsic code sequence (at step S7).

(14) Since the eighth element of TRIE represents "K3" in the intrinsic code sequence storage portion 23, it is determined whether or not the rest of the key matches the content of the intrinsic code sequence of "K3" (at step S10).

(15) Since the rest of the key is "がさ#" and the intrinsic code sequence at the position of "K3" is "がさ#", the determined result is YES and thereby the retrieval result is successful (at step S11).

[In the case that a retrieval request of a key "あさ#" is issued (in the case that the retrieval result is unsuccessful)]

(1) The key "あさ#" is input (at step s1 of FIG. 5).

(2) "1" is designated to the pointer value so as to represent the first node (at step S2).

Steps (3) to (13) that are the same as those of the retrieval of the key "あさがさ#" are performed.

(14) Since the eighth element of TRIE represents "K3" in the intrinsic code sequence storage portion 23, it is determined whether or not the rest of the key matches the intrinsic code sequence of "K3" (at step S10).

(15) Since the rest of the key is "#" and the intrinsic code sequence at the position of "K3" is "がさ#", the determined result is NO and thereby the retrieval result is unsuccessful (at step S12).

Figure 8:
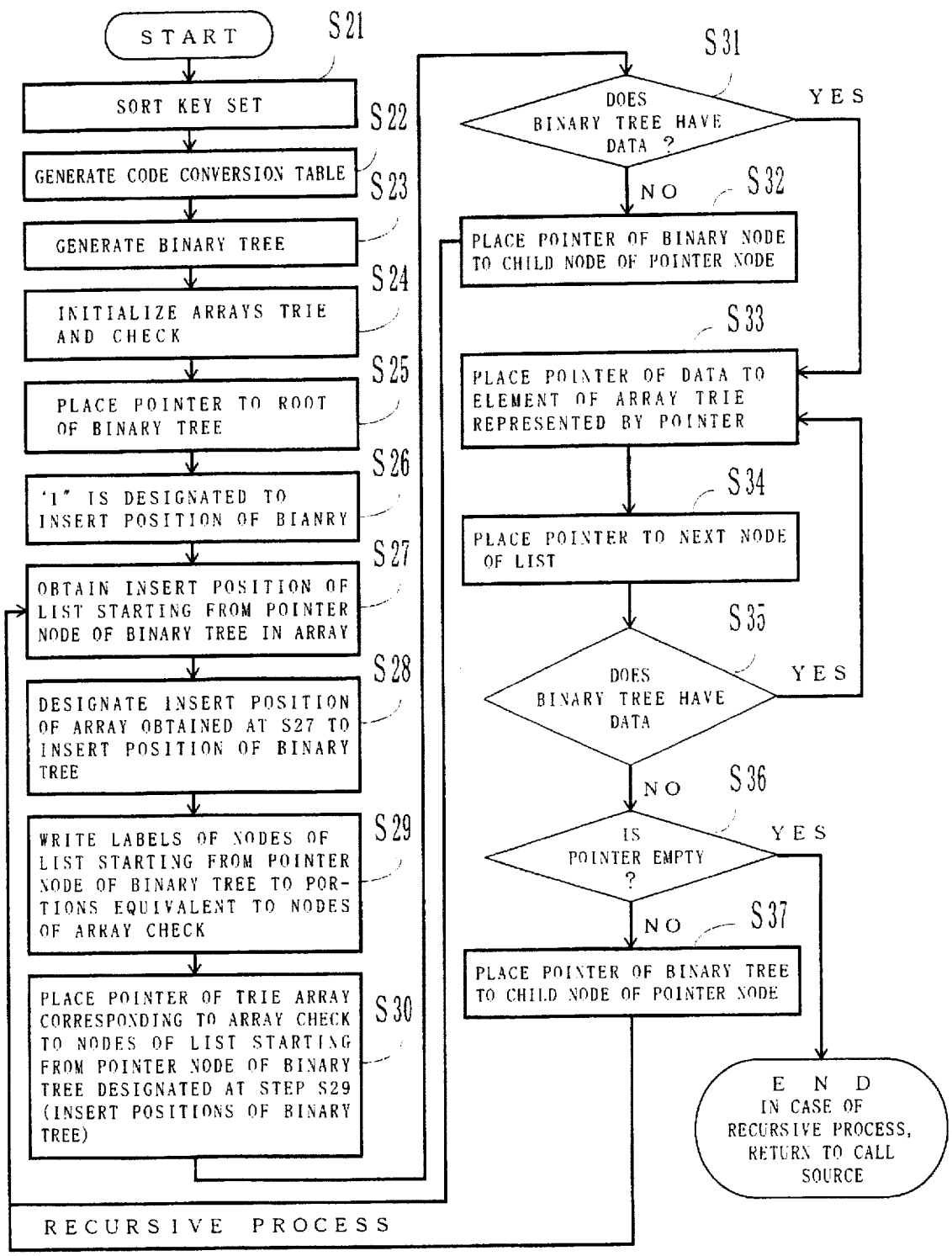
FIG. 8 is a flow chart showing a TRIE node compressing process.

Next, the method for generating compressed TRIE nodes according to the present invention will be described. FIG. 8 is a flow chart showing a TRIE compression process for compressing TRIE nodes so as to generate arrays TRIE and CHECK.

At step S21, the process unit 10 sorts a key set to be generated as TRIE nodes. Thereafter, at step S22, the number of characters that construct the key set is counted. Numbers 1, 2, 3, ..., n are designated to the individual characters in the order of frequency in use so as to generate a code conversion table 14. At step S23, a binary tree of the sorted key set is generated. At this point, the binary tree has a minimum affix (prefix, suffix) portion. In addition, the binary tree has pointers to the compressed TRIE nodes.

Figure 9:
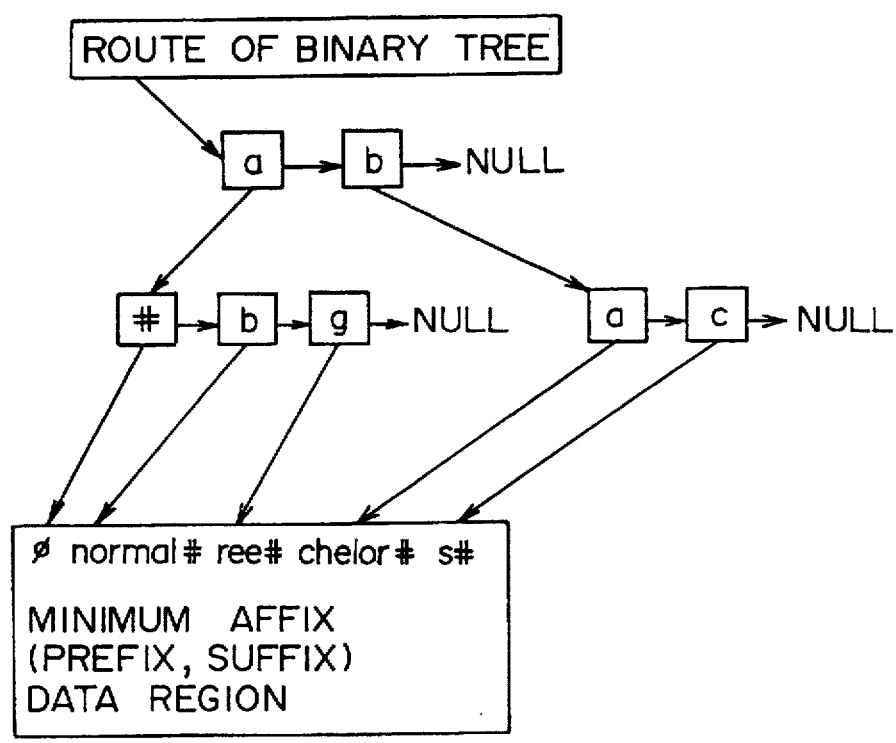
FIG. 9 is a schematic diagram showing an example of an English binary tree.

From the key set as shown in FIG. 4A, a binary tree as shown in FIG. 9 is generated. In a minimum affix and data region shown in FIG. 9, a minimum affix portion or data corresponding to the intrinsic code sequences shown in FIG. 4C is stored. At this point, the content of the code conversion table 14 is as shown in FIG. 3A.

Next, after step S24, the binary tree is converted into compressed TRIE nodes.

At step S24, the arrays TRIE and CHECK are initialized. At step S25, the initial state of a pointer that represents the position of the binary tree is designated to a root node of the binary tree. At step S26, the position of the root node of the binary tree in the array is designated to the position of index=1.

FIG. 10 is a table showing the initial states of the arrays TRIE and CHECK.

At step S27, the positions of the node sequences (node list) starting from nodes (pointer nodes) of the binary tree represented by the current pointers are obtained in TRIE and CHECK. When the desired regions of the arrays corresponding to the positions of elements of the node list are not used, the node sequences can be inserted at the beginning of the node lists. The node sequences are inserted at the first available positions of the arrays.

Thereafter, at step S28, the index value of the position of the node list obtained at step S27 is placed in the insert position of the binary tree in TRIE.

For example, when the pointer node of the binary tree represents the root node shown in FIG. 9, the position of the root node is the position of index=1 obtained at step S26. In this case, at step S28, the value of the start position of the list to be inserted should be placed at the position of index=1. However, in the case of the root node, the start position of the list has been designated by the initializing process. Thus, step S28 is omitted.

Thereafter, at step S29, the level of each node that starts from the pointer node of the binary tree is written to a corresponding portion of CHECK.

In this case, the list has labels a and b. The inner codes of the TRIE nodes are 2 and 3, respectively. In addition, the position of which a node can be inserted is the position of index=1. Thus, the write position of a is 1+2=3. The write position of b is 1+3=4. FIG. 11 shows the result of the process at step 29.

At step S30, the pointer to TRIE corresponding to CHECK that has been designated at step S29 is designated to each node of the list starting from the pointer node of the binary tree. The positions of TRIE represented by these pointers are positions into which the binary tree is inserted.

The pointers are placed from the nodes a and b of the binary tree to TRIE corresponding to the labels a and b, respectively. The positions of these pointers in TRIE are denoted by @1a and @1b. FIG. 12 shows the result of the process at step S30.

Thereafter, at step S31, it is determined whether or not the pointer node of the binary tree has data. When the pointer node does not have data, the flow advances to step S32. At step S32, a child node of the current node is designated to the pointer of the binary tree. Thereafter, the flow returns to step 27. The process after step S27 is recursively repeated.

Since the pointer node of the binary tree (node a of a→b→NULL) does not have data, the flow advances to step S32. At step S32, a child node of the pointer node is designated as a pointer node of the binary tree. Thus, node # of #→b→g→NULL becomes the pointer node. The process after step S32 is recursively performed. After the process is completed, the flow advances to step S34.

At step S27, the insert position of the binary tree is obtained in the following manner.

Figure 13:
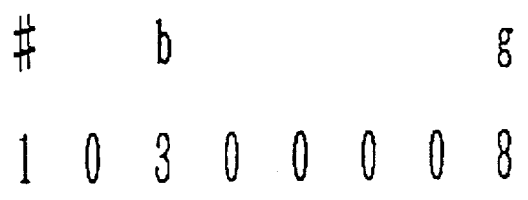

The labels of the nodes of the list #→b→g→NULL of the binary tree starting from the pointer node are converted into TRIE inner codes corresponding to the code conversion table shown in FIG. 3A. FIG. 13 shows the resultant TRIE inner codes. The insert position should be selected so that the above-described labels do not match those in CHECK and the insert position is not the start position of the TRIE nodes. The start position of the TRIE nodes is a position where there is a node list that starts therefrom as with index=1.

To find an insert position, theoretically, it is determined whether or not labels are redundant from the position of index=1. In addition, it is determined whether or not alternative positions are at the beginning of the nodes. An index value that satisfies such conditions is returned. In this method, when a position in which no element has been inserted is found, the process is completed.

However, since the calculation time is proportional to (index size×number of nodes to be inserted), as the value of index increases, the calculation time drastically increases. To prevent such a problem, elements are inserted in the ascending order of index values. In addition, whenever a node is inserted into an element of the index, it is not moved and deleted. Thus, while the use ratios of the arrays TRIE and CHECK are being monitored, the retrieval position is determined. In other words, the value of index as the retrieval start position is gradually increased. Thus, the real retrieval range can be practically reduced.

Thus, the valid insert position of the list #→b→g→NULL can be obtained as shown in FIG. 14. From FIG. 14, it is clear that the position just preceding the label # is the insert position. Consequently, the index value is 4.

At step S28, the index value 4 obtained at step S27 is inserted into the insert position of the binary tree represented by the pointer @1a as shown in FIG. 15.

At step S29, the labels of the list starting from the pointer node of the binary tree are written to the insert positions of CHECK obtained at step S27. The labels of the list are #, b, and g and their TRIE inner codes are 1, 3, and 8, respectively. In addition, the insert position of the node is the position of index=4. FIG. 16 shows the result of the process of step S29.

At step S30, the pointers are placed from the binary tree to the positions of the array TRIE corresponding to the array CHECK. These pointers in the array TRIE are denoted @2#, @2b, and @2g as shown in FIG. 17.

As the determined result at step S31, since the pointer node of the binary tree (the node # of the list #→b→g→NULL) has data, the flow advances to step S33.

At step S33, the pointer to data represented by the pointer node of the binary tree is designated to the element of TRIE represented by the pointer at step S30.

In this case, the pointer from the node # of the binary tree to the minimum affix portion is designated to a corresponding element of TRIE. In this case, the element of the minimum affix portion is empty. The pointer to an element (data or minimum affix portion) of the minimum affix and data region is denoted by K1 as shown in FIG. 18. In FIG. 18, K1 is empty.

At step S34, the pointer node of the binary tree is advanced by one in the same list for the next element.

In this case, the node b of the list #→b→g→NULL is the pointer node.

At step S35, it is determined whether or not the pointer node of the binary tree has data. When the binary tree pointer node has data, the flow advances to step S33. When the pointer node of the binary tree does not have data, the flow advances to step S36. At step S36, it is determined whether or not the pointer is NULL. When the pointer is NULL, the process is completed. When the pointer is not NULL, the flow advances to step S37.

At step S37, a child node of the current node is designated to the pointer of the binary tree. The process after step S27 is recursively repeated.

As the determined result at step S35, since the pointer node of the binary tree (the node b of the list #→b→g→NULL) has data, the flow advances to step S33. Thereafter, the same process is performed till the node g. Thus, as shown in FIG. 19, K1 (a pointer to empty), K2 (a pointer to normal#), and K3 (a pointer to ree#) are stored in TRIE. Thus, the pointer of the binary tree becomes NULL and thereby the process is temporarily completed. However, since the process is recursively performed, the flow returns to the call source. Thus, the process is repeated from step S34. In this case, the pointer node of the binary tree becomes the node b of the list a→b→NULL.

Thereafter, the processes at steps S35 and S36 are performed. For a child node of the node b, the process after step 27 is recursively performed. FIG. 20 shows the contents of the arrays TRIE and CHECK as the results of the recursive process. In FIG. 20, K1 is a pointer to empty, K2 is a pointer to normal#, K3 is a pointer to ree#, K4 is a pointer to chelor#, and K5 is a pointer to s#.

After the process is completed, the pointer node of the binary tree becomes the node NULL of the list a→b→NULL. At step S36, since the pointer matches the condition of empty, the process is completed. In this case, since there is no call source for the recursive process, all the processes are completed. The arrays TRIE and CHECK shown in FIG. 20 accord with the arrays TRIE and CHECK shown in FIG. 3B, respectively.

In such a manner, the processing unit 10 performs processes starting from the root of the binary tree, finds the insert position of the compressed TRIE arrays for the route of the binary tree, and designates the pointers from individual nodes of the binary tree to the compressed TRIE arrays. When the current node does not have data, a child node of the current pointer node is designated as a new pointer node. For the child node, the process is recursively performed. Otherwise, a pointer to data is designated from each node of the binary tree to a pointer of the compressed TRIE arrays. The pointer node is advanced to the next node of the list. Since the end node of the list of the binary tree is empty, when the last process of the list of the root node of the binary tree is completed, the TRIE compression process is completed.

Figure 21A:
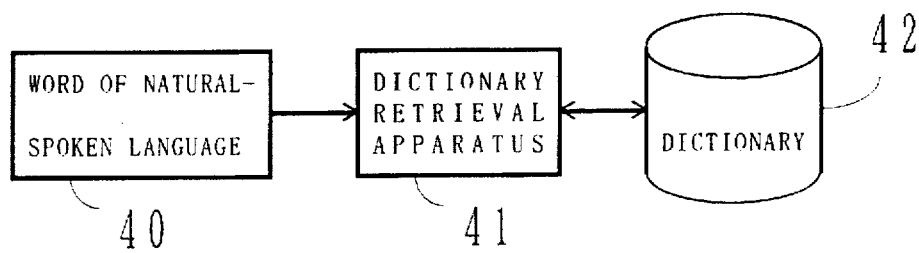
FIGS. 21A and 21B are block diagrams showing examples of dictionary retrieval apparatuses.

In an example shown in FIG. 21A, with an input key of a word 40 of a natural-spoken language, a dictionary retrieval apparatus 41 according to the present invention retrieves a dictionary 42. For example, the present invention can be applied for a Kana-Kanji conversion dictionary for a wordprocessor and a dictionary for analyzing morpheme and syntax for use with a natural-spoken language analyzing apparatus or a machine translating apparatus.

Figure 21B:
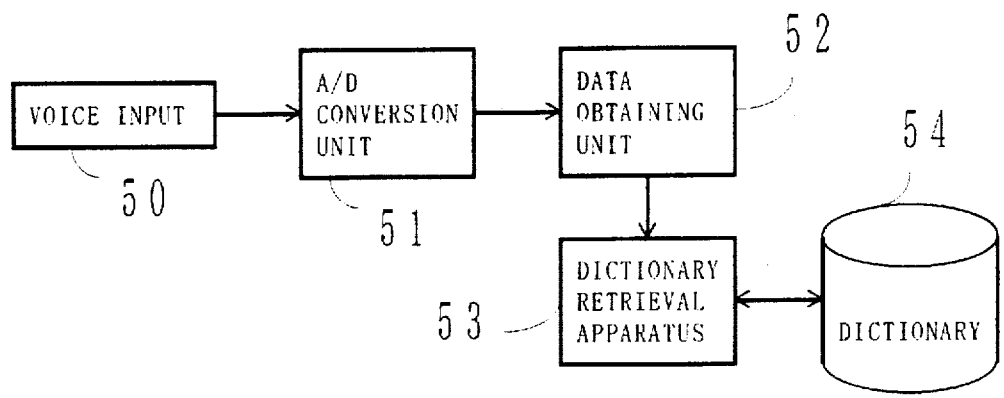

In the example shown in FIG. 21B, a signal of a voice input 50 from a microphone or the like is converted by an A/D converting unit 51 from an analog signal into a digital signal. With an input key of voice data of such as a voice feature parameter obtained by a data obtaining unit 52, a dictionary retrieval apparatus 53 according to the present invention retrieves a dictionary 54. By a combination of the technology of the present invention and voice data, compressed TRIE nodes are constructed. Thus, a dictionary for effectively recognizing voice data can be retrieved.

Figure 21C:
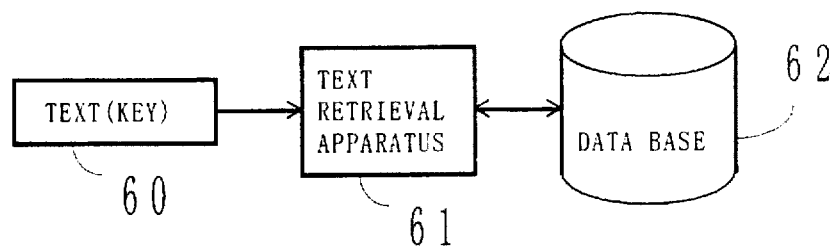
FIG. 21C is a block diagram showing an example of a text retrieval apparatus.

In the example shown in FIG. 21C, with an input key of a text 60, a text retrieval apparatus 61 according to the present invention retrieves a database 62. Thus, with a key of a text, a database 62 for a Japanese text can be effectively retrieved.

As described above, according to the present invention, electronic dictionaries for both Japanese characters and English characters can be retrieved effectively from the view points of both speed and storage capacity. Using such a dictionary system, the basic functions for a Kana-Kanji conversion dictionary for a wordprocessor, a morpheme analyzing apparatus, and a syntax analyzing apparatus can be effectively utilized.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A retrieval apparatus for retrieving data with an input key corresponding to a TRIE method, comprising:

node storage means for storing compressed TRIE nodes having information of a next TRIE node and including at least one TRIE node which overlaps with another TRIE node;

node element identification label storage means for storing a label for a TRIE node so as to determine whether or not a unit code to be retrieved is included in the node when said compressed TRIE nodes are referred to;

intrinsic code sequence storage means for storing an intrinsic code sequence of a key in the TRIE node, the TRIE nodes further having pointer information to the intrinsic code sequence;

code conversion processing means for converting each unit code obtained from the input key into a TRIE inner code; and node selection processing means for obtaining one of the information of the next TRIE node from said node storage means and the pointer information to the intrinsic code sequence when a unit code is included in the TRIE node as a determined result using said node element identifying label storage means and for processing a next unit code using said obtained information.

2. The retrieval apparatus as set forth in claim 1, wherein each TRIE node of said node storage means is adapted for storing a pointer that is the start point of the next TRIE node or a pointer to the intrinsic code sequence of the key in said intrinsic code sequence storage means, and wherein said node selection processing means is adapted for processing a TRIE node corresponding to an inner code obtained from the pointer representing the start point and the next unit code when a current TRIE node stores the pointer representing the start point of the next TRIE node, and for collating the rest of the input key after the next unit code with an intrinsic code sequence of a key represented by the pointer when the current TRIE node stores the pointer to the intrinsic code sequence of the key in said intrinsic code sequence storage means.

3. The retrieval apparatus as set forth in claim 2, wherein said node selection processing means is adapted for adding a value of an inner code obtained from the next unit code to a value of the pointer representing the start point of the next TRIE node, obtaining a position of the next TRIE node, and determining whether or not the next unit code is included in the next TRIE node.

4. The retrieval apparatus as set forth in claim 1, further comprising:

code conversion table storage means for storing a code conversion table that has unit codes arranged in the order of frequency in use of input keys, wherein said code conversion processing means is adapted for converting a unit code with a higher frequency of use into a higher order inner code using the code conversion table, and wherein said node storage means is adapted for storing TRIE nodes corresponding to the order of inner codes.

5. The retrieval apparatus as set forth in claim 1, wherein said identifying label storage means is adapted for storing a label array for storing labels of a plurality of node sequences that construct a binary tree without redundancy, and wherein said node storage means is adapted for storing one of next TRIE information and the pointer information to said intrinsic code sequence storage means corresponding to the label array.

6. The dictionary retrieval apparatus as set forth in claim 1, wherein said node storage means stores the compressed TRIE nodes with a key of a word of a natural language, and said node selection processing means retrieves data corresponding to the word of the natural language corresponding to the compressed TRIE nodes.

7. The dictionary retrieval apparatus as set forth in claim 1, wherein said node storage means stores the compressed TRIE nodes with a key of voice data of a natural language, and said node selection processing means retrieves data corresponding to the voice data of the natural language corresponding to the compressed TRIE nodes.

8. The dictionary retrieval apparatus as set forth in claim 1, wherein said node storage means stores the compressed TRIE nodes with a key of text data of a natural language, and said node selection processing means retrieves a text of a database corresponding to the text data with the compressed TRIE nodes.

9. A computer-readable storage medium for storing a program for a computer for retrieving data with an input key corresponding to a TRIE method, used to direct the computer to perform the functions of:

generating compressed TRIE nodes including labels for determining whether or not a unit code to be retrieved is included in a TRIE node, said compressed TRIE nodes including at least one TRIE node which overlaps with another TRIE node;

generating an intrinsic code sequence that represents a code sequence intrinsic to a key in the TRIE nodes;

obtaining each unit code from the input key and for converting the unit code into a TRIE inner code;

determining whether or not a unit code is included in a TRIE node using the labels; and obtaining one of next TRIE node information and pointer information to the intrinsic code sequence from the TRIE node when the unit code is included in the TRIE node and for processing a next unit code using obtained information.

10. A retrieval method for retrieving data with an input key corresponding to a TRIE node method, comprising the steps of:

generating compressed TRIE nodes including labels for determining whether or not a unit code to be retrieved is included in a TRIE node, said compressed TRIE nodes having information of a next TRIE node and including at least one TRIE node which overlaps with another TRIE node;

generating an intrinsic code sequence that represents a code sequence intrinsic to a key in the TRIE nodes, said TRIE nodes further having pointer information to the intrinsic code sequence;

obtaining each unit code from the input key and for converting the unit code into a TRIE inner code;

determining whether or not a unit code is included in a TRIE node using the labels;

obtaining one of next TRIE node information and pointer information to the intrinsic code sequence form the TRIE node when the unit code is included in the TRIE node; and processing a next unit code using obtained information.

11. The retrieval method as set forth in claim 10, further comprising the steps of:

generating a binary tree that represents a set of a plurality of keys;

storing labels of a plurality of node sequences that construct the binary tree in a label array without redundancy;

storing one of next TRIE information and pointer information to the intrinsic code sequence in a TRIE array corresponding to the label array; and generating the compressed TRIE nodes from the label array and the TRIE array.

12. The retrieval method as set forth in claim 11, further comprising the steps of:

storing a label of a first node sequence of the binary tree in a first position of the label array;

obtaining a second position where a second node sequence of the binary tree is able to be inserted in the compressed TRIE nodes;

inserting the second node sequence at the second position; and storing position information that represents the second position at the first position of the TRIE array.

13. A retrieval apparatus for data having a key, comprising:

an intrinsic code sequence for a portion of the key;

compressed TRIE nodes, each having at least one of information of a next TRIE node and pointer information to said intrinsic code sequence;

identification labels, each corresponding to each of said compressed TRIE nodes;

TRIE inner codes, each corresponding to a unit code of an input key; and a node selection processor determining whether the unit code matches the identification label of the compressed TRIE node corresponding to the TRIE inner code of the unit code, wherein when said node selection processor determines that the unit code matches the identification label and the compressed TRIE node corresponding to the TRIE inner code of the unit code has the information of the next TRIE node, said node selection processor processes a next unit code of the input key by obtaining the next TRIE node using the information of the next TRIE node and the TRIE inner code of the next unit code, and wherein when said node selection processor determines that the unit code matches the identification label and the compressed TRIE node corresponding to the TRIE inner code of the unit code has the pointer information to said intrinsic code sequence, said node selection processor determines whether a remaining portion of the input key matches said intrinsic code sequence identified by the pointer information.

14. A method of retrieving data having a key, comprising:

identifying a TRIE inner code of a unit code of an input key;

determining whether a unit code of an input key matches an identification label of a compressed TRIE node corresponding to the TRIE inner code of the unit code;

processing a next unit code of the input key by obtaining a next TRIE node using information of a next TRIE node and the TRIE inner code of the next unit code when said determining determines that the unit code matches the identification label and the compressed TRIE node corresponding to the TRIE inner code of the unit code has the information of the next TRIE node; and determining whether a remaining portion of the input key matches an intrinsic code sequence identified by pointer information when said determining determines that the unit code matches the identification label and the compressed TRIE node corresponding to the TRIE inner code of the unit code has the pointer information to the intrinsic code sequence.

* * * * *